United States Patent [19]
Walker

[11] 3,936,683
[45] Feb. 3, 1976

[54] MAGNETIC COUPLING
[76] Inventor: Alan John Walker, 3 Argyle St., Dornoch, Sutherland, England
[22] Filed: Aug. 16, 1974
[21] Appl. No.: 497,925

[30] Foreign Application Priority Data
Aug. 17, 1973 United Kingdom............ 38988/73

[52] U.S. Cl................................. 310/103; 310/104
[51] Int. Cl.².......................................... H02K 49/06
[58] Field of Search ........ 310/92, 93, 103, 104, 105

[56] References Cited
UNITED STATES PATENTS
1,724,272  8/1929  Ford .................................... 310/104
1,724,873  8/1929  Ford ............................... 310/103 X
3,378,710  4/1968  Martin, Jr. .......................... 310/104

Primary Examiner—Donovan F. Duggan
Attorney, Agent, or Firm—Pennie & Edmonds

[57] ABSTRACT

In a magnetic transmission device a torque magnetic ring having an even number of axially aligned bars of highly magnetic material is rotatable mounted relative to at least one of two magnetic pole rings for transmitting torque between the pole rings.

8 Claims, 4 Drawing Figures

MAGNETIC COUPLING

THE PRIOR ART

Known couplings (or clutches) consist of rotatable magnetic pole rings, between which a magnetically permeable separating wall is arranged, and which are so constructed that each north pole of the first pole ring faces a south pole of the second pole ring. Magnetic couplings are also known in which, apart from the pole rings made of permanent magnet material, magnetically conducting pieces made of soft iron for example are provided in addition and which lead to a concentration of the magnetic flux. All these devices have the common drawback that they require magnetic materials, the mechanical strength of which is very small and which limits the rotational speeds of the pole rings. This is particularly true of permanent magnets with very high magnetic energy, e.g. magnets formed by sintering rare earth. The mechanical strength of these magnets is so small that often the internal magnetic repulsion forces approach a level sufficient to cause disintegration of the magnets. Thus, whilst theoretically magnetic couplings can be made with the new materials which can transmit much larger powers than hitherto, the practical implementation is prevented by the mechanical properties of the magnet materials. This is particularly true when the couplings are to be operated at high rotational speeds or when high angular accelerations are necessary.

OBJECT OF THE INVENTION

The object of the invention is to provide a magnetic coupling having pole rings made of magnetic material of small mechanical strength in which the pole rings are not to be operated at high rotational speeds.

DESCRIPTION OF THE INVENTION

The invention resides in providing a magnetic coupling in which two individual rotors, spaced apart from one another and of highly permeable magnetic material, are each arranged in the magnetic vicinity of a stationary magnet assembly so that a magnetic field is induced in each rotor, the rotors being of such shape that the field induced in one rotor reacts with the field induced in the other so that when one rotor is caused to rotate, the other is driven to rotate thereby. The space between the rotors may include a separating wall of non-magnetic material.

Accordingly electro-magnets may replace permanent magnets. In this way an interruption of the magnetic coupling is possible and the coupling becomes a clutch. Magnetic clutches with electro-magnetic excitation have already been proposed. However, in such clutches the energy is fed to a rotating magnet coil via slip rings. The invention therefore obviates the need for such slip rings.

The invention will be described with reference to the following Figures.

Figure 1:
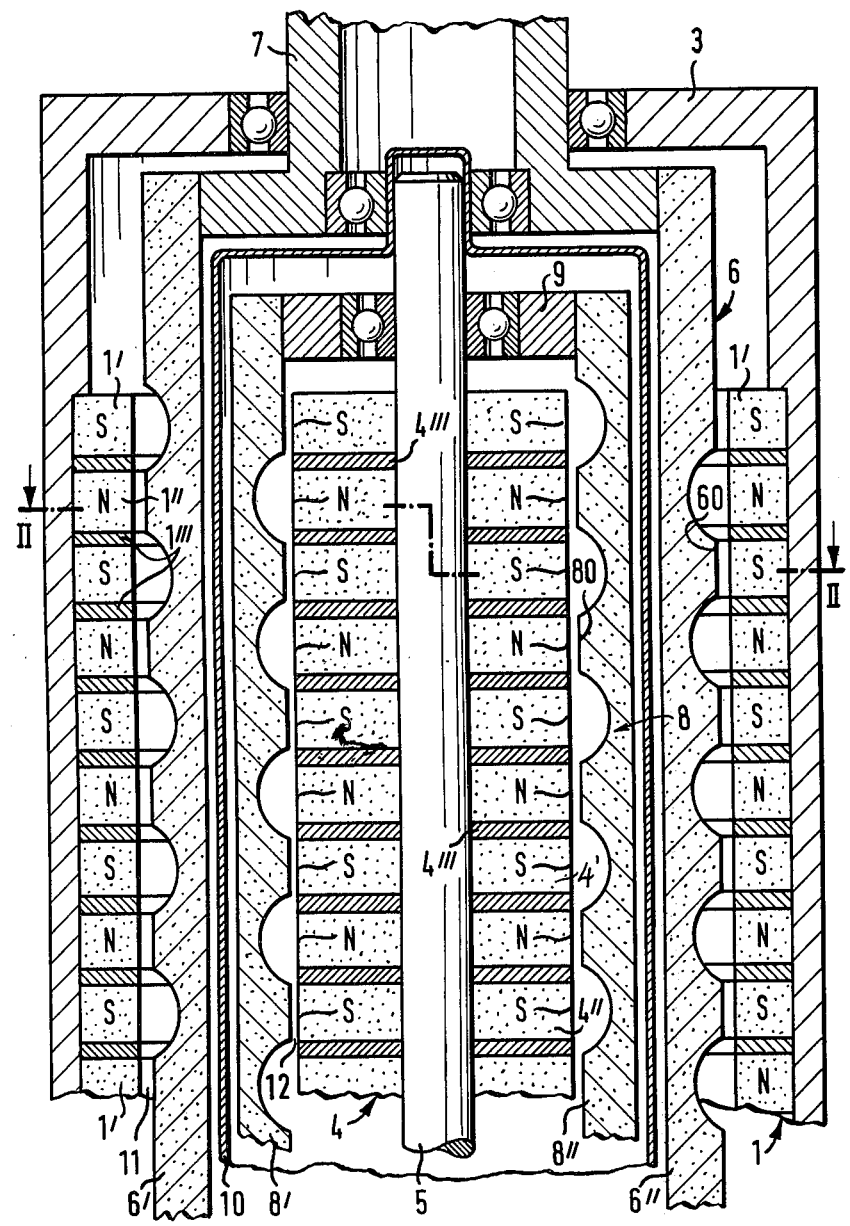
FIGS. 1 and 1A show diagrammatically in longitudinal and transverse cross-section a coupling according to the invention.
Figure 1A:
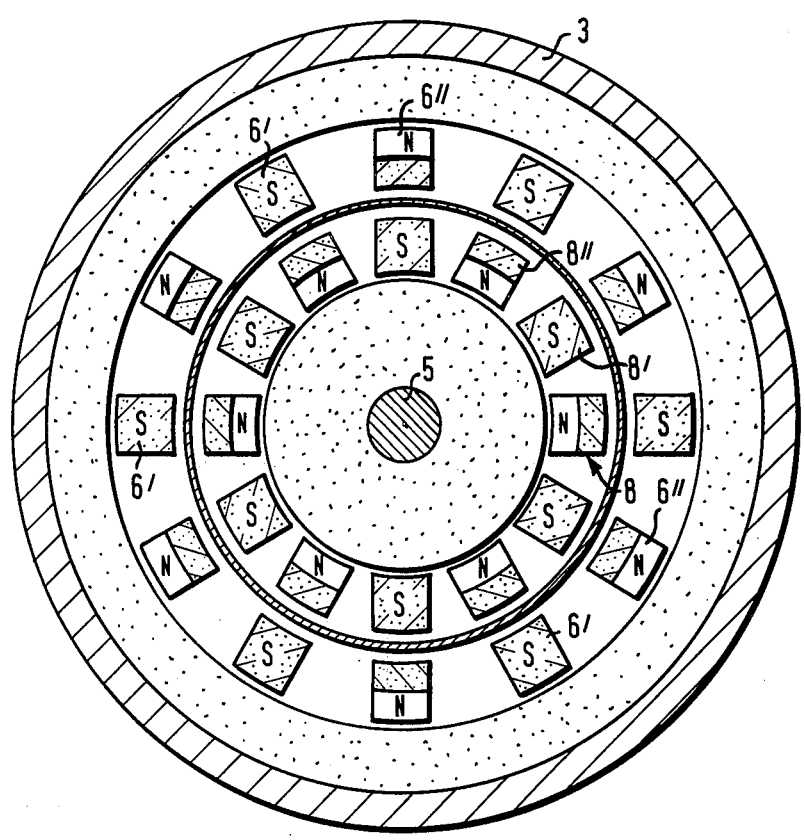

Referring to FIG. 1, this coupling consists of a fixed and stationary outer annular magnet assembly 1 comprising a series of radially and alternately polarised ring magnets 1' and 1" spaced apart from one another by rings 1''' of non-magnetic material, assembled within a housing 3 of highly permeable magnetic material, such as soft iron for example, which acts to magnetically bridge the outward facing poles of the ring magnets 1' and 1". A fixed and stationary inner annular magnet assembly 4 is also provided, within outer assembly 1, co-axial therewith and radially spaced therefrom, comprising a series of radially and alternately polarised ring magnets 4' and 4" spaced apart from one another by rings 4''' of non-magnet material and assembled upon a rod 5 of highly permeable magnetic material, such as soft iron for example, which magnetically bridges the inward facing poles of rings 4' and 4".

Two co-axial and annular torque transmitting rotors, 6 and 8 respectively, are mounted for individual rotation within the annular space defined by assemblies 1 and 4, rotor 8 being mounted within the bore of rotor 6 and radially spaced therefrom. Rotor 6 is separated from rotor 8 by an interposed wall 10 of non-magnetic material, preferably of high electrical resistivity in order to minimise losses due to electrical currents which may be induced therein in operation, spaced from each rotor and fixed so that it is stationary at all times.

Rotor 6 comprises an even number of axially aligned bars 6' and 6" of highly magnetic material, again such as soft iron, equally spaced around the circumference of an imaginary cylinder, and attached at their ends to wheel discs 7 (only one is shown), one of which rotatably extends through the end of housing 3 as a torque-transmitting shaft. Spaced along each rod of bars 6' and 6" are a number of outwardly facing poles 60, each pole 60 of bars 6' being arranged opposite an inward facing north pole of assembly 1, i.e. opposite rings 1''', whilst each pole 60 of bars 6" is arranged opposite a south pole of assembly 1, i.e. opposite rings 1'. This the inward facing surface of bars 6' take up a north polarity whilst the intermediately disposed bars 6" take up a south polarity on their inner surface.

In like manner, rotor 8 is an arrangement of highly permeable bars 8' and 8" having poles 80 arranged so that the outer surfaces of bars 8' are south poles and the corresponding surfaces of bars 8" are north poles.

Rotor 8 is connected to a shaft (not shown) for torque transmission which rotatably extends through the end (not shown) of housing 3.

The space between bars 6' and 6" may be occupied by non-magnetic material, keyed or otherwise joined or bonded to the bars in order to provide a rotor 6 of high strength. The space between bars 8' and 8" may likewise be occupied.

In operation, when either rotor 6 or 8 is caused to rotate the magnetic intercoupling between the two rotors via bars 6', 6" and 8', 8", causes the other rotor to rotate in sympathy therewith.

Air gaps 11 and 12 are made as small as practicability allows.

Figure 2:
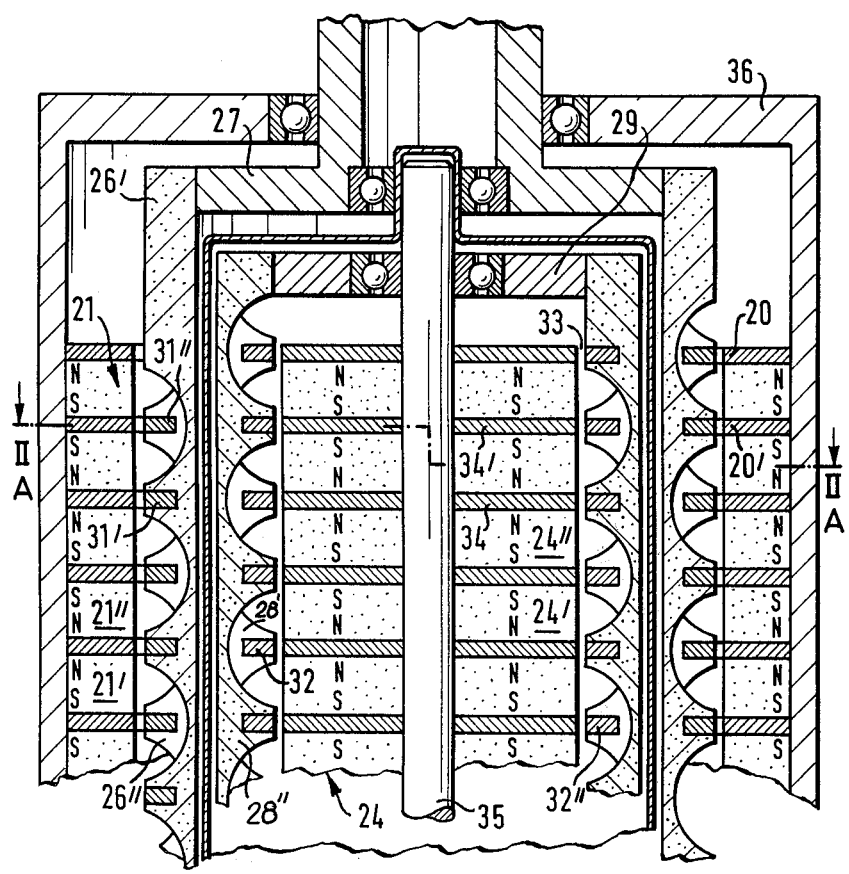
FIGS. 2 and 2A show in similar manner another form of coupling.
Figure 2A:
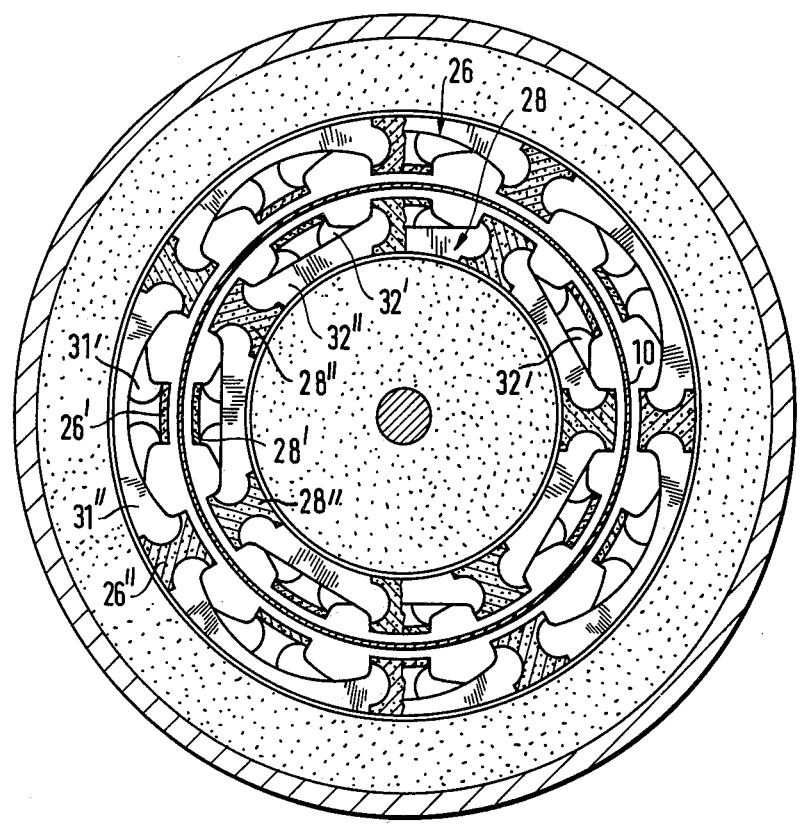

The torque transmission device illustrated in FIG. 2 differs from that of FIG. 1 in that the ring magnets of the outer and inner magnet assemblies 21 and 24 respectively are axially polarised, ring magnets 21' and 21" being separated by rings 20 and 20' of highly permeable magnetic material so that rings 20 constitute north poles and intermediate rings 20' are south poles. Likewise, the magnets 24' and 24" of assembly 24 are separated alternately by rings 34 and 34' such that all rings 34 assume a north polarity and rings 34' a south polarity.

Rotor 26 comprises a squirrel cage of alternate bars 26' and 26'' provided with annular pole pieces 31' in bars 26' and 31'' in bars 26''.

The pole pieces 31' of bars 26' are arranged to cooperate only with the north-pole rings 20 of outer assembly 21 and the pole-pieces 31'' of intermediate bars 26' are arranged to co-operate with the south pole rings 20'.

Rotor 28 comprises a squirrel cage of alternate bars 28' and 28'' provided with annular pole pieces 32' in bar 28' and 32'' in bar 28''.

Rotors 26 and 28 are separated one from the other by an interposed wall 10 of magnetic permeable material, and both rotors have shaft means for the transmission of torque thereto or therefrom.

In similar fashion to the first described example of the invention, bars 26' of rotor 26 have inward facing surfaces northerly polarised whilst the corresponding surfaces of bars 26'' are southerly polarised. Bars 28' of rotor 28 constitute outward facing north poles and bars 28'' constitute outward facing south poles.

Wheel discs 27 are the discs to which the ends of bars 26', 26'' are attached (only one disc 27 is shown) and wheel discs 29 are the discs to which the ends of bars 28', 28'' are likewise attached (only one disc 29 is shown).

In this embodiment, housing 36 and rod 35 are of non-magnetic material, and the space between the bars of both rotors 26 and 28 may be filled with non-magnetic material.

The invention is deemed to embrace magnetic torque transmission devices substantially as described herein with reference to the accompanying drawings, and all such transmission devices in which the means for producing the magnetic fields are stationary in operation and in which the torque coupling is between separate but co-operating rotors of non-polarised magnetic material, each rotor being influenced by a respective stationary magnetic field producer.

I claim:

1. A magnetic transmission device by which torque can be transmitted without contact of the driving and driven elements comprising a first stationary magnetic pole ring, a second stationary magnetic pole ring circumferentially surrounding and radially spaced from said first magnetic pole ring, a first rotatable torque transmitting ring connected to one of said elements and having an even number of axially aligned bars of highly magnetic material causing a magnetic connection between said first pole ring and said second pole ring, and a second rotatable torque transmitting ring connected to the other of said elements with the first torque ring circumferentially surrounding and being radially spaced from said second torque ring and with said first and second torque transmitting rings separating said magnetic rings in the radial direction.

2. A magnetic transmission device according to claim 1 having in addition a magnetic conductive separating wall positioned between the first and second torque transmitting rings.

3. A magnetic transmission device by which torque can be transmitted between a driven element and a driving element comprising a first stationary magnetic pole ring, a first rotatable torque ring connected to one of said elements circumferentially surrounding and radially spaced from said first magnetic pole ring, a second rotatable torque ring rotatable with respect to said first torque ring connected to the other of said elements and circumferentially surrounding and radially spaced from said first torque ring, and a second stationary magnetic pole ring circumferentially surrounding and radially spaced from said second torque ring.

4. A magnetic transmission device according to claim 3 wherein said magnetic pole rings comprise permanent magnets.

5. A magnetic transmission device according to claim 3 wherein the magnetic pole rings are magnetized in an axial direction.

6. A magnetic transmission device according to claim 3 wherein the magnetic pole rings are magnetized in a radial direction.

7. A magnetic transmission device according to claim 6 wherein the magnetic pole rings are aligned in an axial direction.

8. A magnetic transmission device according to claim 3 wherein the torque transmitting rings each comprise a plurality of axially aligned bars of highly magnetic material and where each bar has axially extending projections with the number of projections being equal to the number of poles of the radially adjacent magnetic pole ring.

* * * * *